US008150139B2

(12) United States Patent
Couronne et al.

(10) Patent No.: US 8,150,139 B2
(45) Date of Patent: Apr. 3, 2012

(54) METHOD AND DEVICE FOR RECOGNIZING A COIN BY USING THE EMBOSSED PATTERN THEREOF

(75) Inventors: Robert Couronne, Erlangen (DE); Andreas Kuleschow, Oberasbach (DE); Klaus Spinnler, Erlangen (DE)

(73) Assignee: Walter Hanke Mechanische Werkstatten GmbH & Co. KG, Berlin (DE)

( * ) Notice: Subject to any disclaimer, the term of this patent is extended or adjusted under 35 U.S.C. 154(b) by 1050 days.

(21) Appl. No.: 11/917,191

(22) PCT Filed: Jun. 14, 2006

(86) PCT No.: PCT/EP2006/006529
§ 371 (c)(1),
(2), (4) Date: Dec. 12, 2007

(87) PCT Pub. No.: WO2006/133974
PCT Pub. Date: Dec. 21, 2006

(65) Prior Publication Data

US 2008/0205741 A1    Aug. 28, 2008

(30) Foreign Application Priority Data

Jun. 16, 2005 (DE) ........................ 10 2005 028 669

(51) Int. Cl.
*G06K 9/00*    (2006.01)
(52) U.S. Cl. ........................................................ 382/136
(58) Field of Classification Search ........................ None
See application file for complete search history.

(56) References Cited

U.S. PATENT DOCUMENTS

| | | | | |
|---|---|---|---|---|
| 4,598,997 | A * | 7/1986 | Steigmeier et al. | 356/237.5 |
| 5,220,614 | A | 6/1993 | Crain | |
| 5,224,176 | A | 6/1993 | Crain | |
| 5,839,563 | A * | 11/1998 | Takahashi | 194/328 |
| 6,064,762 | A | 5/2000 | Haenel | |
| 6,328,150 | B1 * | 12/2001 | Hibari | 194/317 |
| 6,499,581 | B2 * | 12/2002 | Yoshida et al. | 194/318 |
| 2001/0013456 | A1 * | 8/2001 | Ishida et al. | 194/217 |
| 2003/0108232 | A1 | 6/2003 | Yang | |

(Continued)

FOREIGN PATENT DOCUMENTS

DE    2919446 A1    5/1979

(Continued)

OTHER PUBLICATIONS

International Search Report and Written Opinion for PCT/EP2006/006529 dated Sep. 15, 2006.

(Continued)

*Primary Examiner* — Bhavesh Mehta
*Assistant Examiner* — Tahmina Ansari
(74) *Attorney, Agent, or Firm* — Barnes & Thornburg LLP

(57) ABSTRACT

The invention relates to a method and device for recognizing a coin by using the embossed pattern characteristics thereof. For this purpose, the inventive method comprises in spreading the characteristics of the picture, in reducing said characteristics by reducing said picture and in transforming it by polar transformation, in comparing the transformed picture with a plurality of reference patterns according to a first simplified criterion, in creating a list of the reference patterns, in sorting them according to the similarity thereof with the transformed picture and in comparing the transformed picture with the reference patterns contained in the list according to the sorting thereof upon a second exact criterion.

20 Claims, 3 Drawing Sheets

U.S. PATENT DOCUMENTS

Figure 1:

| | | | | |
|---|---|---|---|---|
| 2003/0169416 | A1 * | 9/2003 | Adameck et al. | 356/71 |
| 2004/0129528 | A1 | 7/2004 | Takebayashi | |
| 2004/0168881 | A1 * | 9/2004 | Eich et al. | 194/328 |
| 2008/0205741 | A1 * | 8/2008 | Couronne et al. | 382/136 |

FOREIGN PATENT DOCUMENTS

| | | | |
|---|---|---|---|
| DE | 4445386 | C1 | 12/1994 |
| EP | 1492331 | A2 | 12/2004 |

OTHER PUBLICATIONS

Van Der Heuden, Ferdinand, "Image Based Measurement Systems: Object Recognition and Parameter Estimation", 1994, John Wiley and Sons, England pp. 111-114.

Ming, Xing, et al., "Multi-Matching Process Based on Wavelet Transform for Iris Recognition", Jan. 2005, WACV/MOTION'05, vol. 1, pp. 66-70.

* cited by examiner a 1 a 2 a 3 b 1 b 2 b 3

METHOD AND DEVICE FOR RECOGNIZING A COIN BY USING THE EMBOSSED PATTERN THEREOF

CROSS REFERENCE TO RELATED APPLICATIONS

This application is the U.S. national phase of PCT/EP2006/006529 filed Jun. 14, 2006. PCT/EP2006/006529 claims benefit under the Paris Convention to DE 10 2005 028 669.0 filed Jun. 16, 2005. The disclosures of both of DE 10 2005 028 669.0 and PCT/EP2006/006529 are hereby incorporated herein by reference.

The invention relates to a method for recognising a coin which is inserted in a coin-acceptor unit by using the embossed pattern thereof according to the preamble of the main claim and to a device for implementing the method.

A method is known from DE 102 02 383 A1 for recognising an embossed pattern of a coin in a coin machine, in which a picture receiver takes a picture of the embossed pattern of the coin which is moved towards the picture receiver and towards a light source. An evaluation unit compares the picture with the first reference pattern with respect to whether the first reference pattern is contained within the recorded picture and, if it is contained, a test is made as to whether a second reference pattern is contained in a region, the position of which is determined relative to the position of the first reference pattern. The evaluation device produces, as a function of correspondence of the picture with the reference patterns, a valid or invalid signal for the coin. During evaluation, the centre is determined for the recorded picture and in addition the picture is transformed into circular coordinates, the transformed picture being the basis for looking for the reference patterns.

In addition, a method is described in EP 0 798 670 B1 for recognising the embossed pattern of a coin, in which again the picture of the coin is taken, the centre is determined and a polar transformation is undertaken. At a predetermined spacing from the abscissa in the polar-transformed image, the transformed embossed pattern is scanned and compared with a reference pattern at a corresponding spacing, the patterns being displaced relative to each other in order to bring the measured coin in correspondence with the reference coin with respect to the angle.

One of the main difficulties in the evaluation of the embossed pattern is this large quantity of data which must be processed within the time in which the coin falls through the machine in order to ensure accurate recognition. In order to be able to measure the diameter to an accuracy of e.g. 0.1 mm, the total picture of the coin must have a resolution of at least 100 pixels per mm. An average coin of approx. 20 mm in diameter is then imaged with 200×200 pixels. Even if only a relatively large fragment of the coin surface is selected for the comparison, the calculation volumes are so large that they can barely be implemented simultaneously during insertion of the coin into a coin machine.

The object therefore underlying the invention is to produce a method for recognising a coin which is inserted into a coin-acceptor unit by using the embossed pattern thereof, which allows recognition of the coin rapidly and reliably.

The object is achieved according to the invention by the characterising features of the main claim in conjunction with the features of the preamble.

As a result of the fact that the features which prescribe a pattern arrangement are spread in the image of the coin and that the features are reduced by reducing the image, the image being subjected to a polar coordinate transformation, the speed can be increased during comparison of the coins with reference patterns and the possibility is allowed of using not only fragments but practically the entire coin surface as reference pattern, which in turn increases the robustness of the method with respect to possible damage and to soiling of the coin, the spreading of the features increasing the robustness of the comparison between the current image and a reference image, in particular even during displacements or rotations of the coin. The polar coordinate transformation thereby converts the rotation of the current coin picture or of the reference pattern into a linear, e.g. horizontal, translation which can be calculated significantly more rapidly.

As a result of the fact that in addition a two-stage comparison is undertaken, in which the image of the coin is compared with the reference patterns according to a first simplified criterion and a list is produced of selected reference patterns with sorting according to the similarity thereof and subsequently a comparison of the image with those reference patterns contained in the list is undertaken corresponding to the sorting thereof according to a second exact criterion, the processing time is substantially shortened.

As a result of the measures indicated in the sub-claims, advantageous developments and improvements are possible.

According to the invention, the spreading is in direct connection with the reduction, the features being spread before the reduction or at the same time as the reduction. The size of the maximum filter is thereby determined by the reduction factor. As a result of the spreading, the physical features of the image during the reduction are preserved and the mathematical features are thereby reduced in order to accelerate the recognition.

It is particularly advantageous to calculate the distribution of the average brightness in the lines of the transformed image as a characteristic for the first simplified criterion, and then to use a one-dimensional correlation between the brightness distribution of the transformed image and the reference pictures or patterns. In this way, even during the first comparison, a good selection of possible reference patterns is achieved. By means of the first simplified criterion, a list of reference patterns corresponding to the similarity thereof to the current picture is produced.

As a second exact criterion, a two-dimensional correlation of the brightness distribution in the transformed image can preferably be used. An exact comparison is thereby implemented, the result of the pre-analysis no longer being taken into account and only the result of the exact comparison being valid.

Figure 3:
Figure 3:
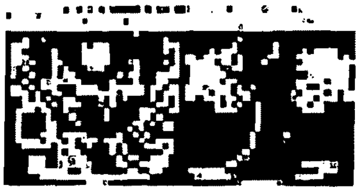
Figure 3:
Figure 4:
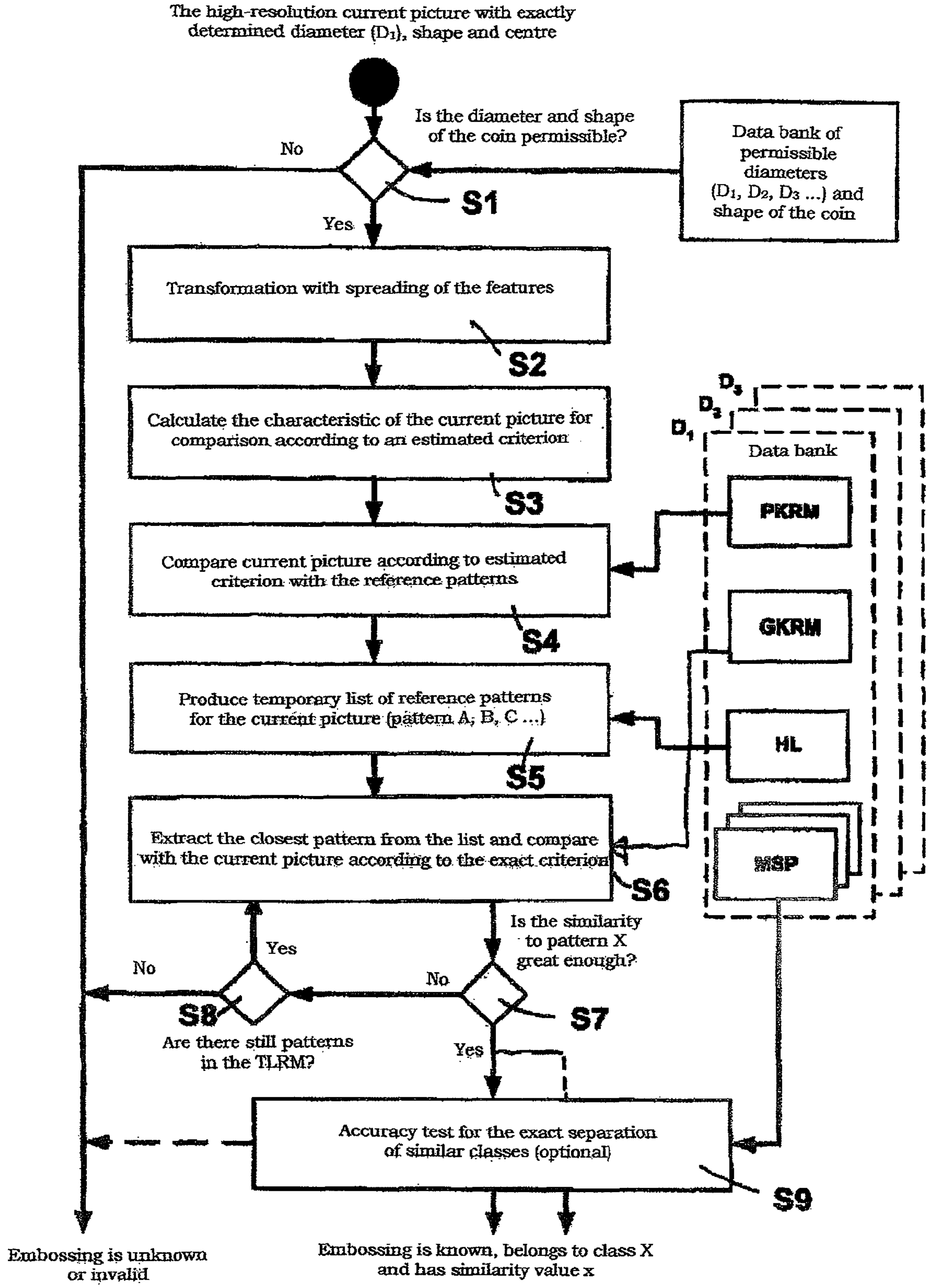

Embodiments of the method according to the invention are explained in more detail in the subsequent description using the annexed drawing. There are shown:

FIG. 1 a representation relating to the polar transformation of a coin,

FIGS. 2*a*1-*a*3 the original embossed pattern of a coin and also two polar transformations of the embossed pattern of the coin with reduction of the features, rotated angularly by 3°, FIGS. 3*b*1-*b*3 views corresponding to FIGS. 2*a*1-*a*3, in which spreading of the features has been undertaken with a maximum filter, and FIG. 4 the representation of a method course for evaluation of the embossed pattern of a coin in a coin machine.

The method according to the invention is used for recognising a coin by evaluation of the embossed pattern thereof. The coin is thereby inserted into the coin-acceptor unit and the image of the coin is taken by means of a picture sensor and is transmitted as pixel data to the evaluation unit. This evaluation unit determines inter alia the exact diameter and the exact centre and also if necessary the shape. In the further evaluation, a polar transformation corresponding to FIG. 1 is implemented inter alia in which for example the radius of the coin is accepted as the outer radius of the transformation and the inner radius of the transformation is 0. The angle θ is counted in clockwise direction, beginning at the positive x axis. As can be detected from FIG. 1 at the bottom, a "distorted" pattern is produced which can be evaluated linearly.

In FIG. 2*a*1, an image of a coin can be detected, which was obtained in a camera module with illumination diagonal to the coin surface, by means of which thin light lines on a dark background can be seen on the coin surface. These thin lines represent characteristic features of the coin which form a pattern or a pattern arrangement or parts thereof. In order to increase the speed during subsequent evaluation, i.e. in the comparison with reference features or patterns, it is advantageous to reduce the number of features. The reduction in features could be implemented for example by reducing the image by means of sub-scanning of picture points. For a reduction factor N, only each Nth pixel is thereby further processed from each line of the original picture, all others are omitted. The same applies also to sub-scanning of picture lines. With such a sub-scanning, a part of the features contained in the original picture is lost. Upon slight rotation or displacement of the original picture, different features are thereby always preserved and the corresponding transformed pictures are dissimilar to each other.

Figure 2:
Figure 2:
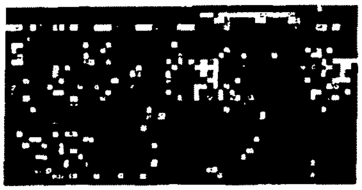
Figure 2:

In FIGS. 2*a*2 and *a*3, a polar transformation corresponding to FIG. 1 is illustrated in which a so-called sub-scanning has been undertaken directly during the transformation, i.e. the picture was transformed with a reduction or diminution factor N, e.g. 6. The transformed images corresponding to FIGS. 2*a*2 and *a*3 are represented enlarged relative to FIG. 2*a*1, the coin having been recorded rotated at *a*3 with respect to *a*2 by 3° and the same transformation underlying both pictures. It has been shown that, during this treatment corresponding to FIGS. 2*a*2, *a*3, it is probable that, by omitting pixels, features are also omitted, as a result of which the ability to be recognised is reduced.

In order to avoid the uncontrolled loss of information during reduction of the features by sub-scanning, spreading of the image is undertaken, the result of the spreading being represented in FIGS. 3*b*1-*b*3. With the spreading, a physical enlargement of the characteristic features respectively to a plurality of pixels is undertaken.

The spreading can be implemented in different ways, in one image as represented for example in FIG. 2*a*1, which has light lines on a dark background, spreading of the features, i.e. of the light lines, can be implemented by filtering with a maximum filter. This is represented in FIG. 3*b*1 in which it can be detected that the "light" features are enlarged physically and distributed to a plurality of pixels.

If the picture of the coin is taken with perpendicular illumination in the camera module, dark lines on a light background can be seen in the image, in this case the spreading can be implemented for example by filtering with a minimum filter.

In order to achieve a reduction in the image, the size both of the maximum and the minimum filter is defined as N×M pixels, N and M corresponding to the reduction factors along the gaps and lines. Subsequently or simultaneously with the filtering and reduction which are based on processing of the pixels, the polar transformation can be implemented corresponding to FIG. 3*b*2.

FIG. 3*b*3 is a representation corresponding to FIG. 2*a*3, in which the embossed pattern is rotated by 3° relative to the representations according to FIGS. 2*a*2 and 3*b*2. As can be detected clearly, the features corresponding to FIGS. 3*b*1-*b*3 are bolder and the similarity between FIGS. 3*b*2 and 3*b*3 is also substantially higher, also according to the subsequently calculated correlation value than that between the images FIGS. 2*a*2 and *a*3. In this type, firstly the spreading and then the reduction or transformation with a reduction is implemented.

In another embodiment of the spreading of the features, this is achieved with a modified polar transformation, the image being reduced simultaneously. For this purpose, for a first point in the transformed picture with the Cartesian coordinates θ, r, a corresponding origin point in the original picture with a spacing from the centre of the coin N*r and an angle of M*θ relative to an orientation determined for the picture is calculated and the brightness of the point in the transformed picture is calculated as maximum of the brightness of the original picture on an area of the size K*K pixels around the origin point, K being the maximum of the reduction factors: K=max (N, M).

With this method of spreading and reduction by means of the modified polar transformation, the same results are achieved using FIG. 2*a*1 as represented in FIG. 3*b*2 and FIG. 3*b*3.

After the spreading, reduction and polar transformation which can take place as described above also simultaneously, a multi-stage comparison of the transformed image corresponding to FIG. 3*b*2 or *b*3 is implemented with a number of reference patterns. For this purpose, in the first stage for the transformed reduced image with spread features, a first simplified criterion forms the basis in that in fact no accurate recognition of the coin can be achieved but in return only a short processing time is required. The comparison of the transformed image with all the reference patterns using the first simplified criterion as basis, produces respectively one similarity value with which a sorted, temporary list of reference patterns is produced. Patterns which deliver better results, i.e. greater similarities, are positioned at the beginning of the list. Consequently, during a comparison in a second stage, the appropriate reference pattern can be found with great probability amongst the first candidates present in the list, as a result of which the processing time is substantially reduced.

There can be used as a characteristic for a simplified criterion, the distribution of the average brightness in lines of the transformed image and, as simplified criterion, a one-dimensional correlation between these characteristics for the transformed image and the reference patterns.

In the second stage, a second comparison between the transformed image and the reference patterns found on the list is implemented corresponding to a second, exact criterion which demands a greater processing time. A correspondence with good accuracy is thereby found with one of the reference patterns and a signal for the permissibility of the coin is emitted or the process of the comparison is stopped. As a characteristic for the second, exact criterion, e.g. the two-dimensional brightness distribution in the transformed image can be used and the comparison can be implemented for example with the help of the two-dimensional correlation.

Since only a predetermined time is available during testing of the coin in the coin-acceptor unit, the test must be stopped and the coin returned if the time has expired. For example, the actual comparison process can be stopped after a predetermined number of reference patterns corresponding to the prescribed list. The maximum number of reference patterns to be processed can thereby be established as a function of the capacity of the computer. A further possibility resides in implementing the comparison calculations of the reference patterns corresponding to their sorted sequence until the coin comes to a predetermined position in its course through the coin-acceptor unit, for example at the position at which it is sorted. If at this time there is still no valid classification result, then the coin falls into the return shaft.

It is possible that, after this second comparison stage, a final decision can be made already about acceptance or rejection of the coin, in particular when all the reference patterns defined by coin classes can be separated readily. For example respectively all valid coins with the same nominal value can be assigned to one coin class. Then each class will comprise at least two reference patterns, one pattern for a head side and one pattern for a number side. If there is a plurality of valid variants for embossed patterns of the head or number side, the number of the pattern is higher. Nevertheless, normally all embossed patterns, apart from intentional forgeries, are so different that high correlation quotients are possible only between images of one class.

A different situation occurs if the similarity of the embossing or of the transformed image to one of the reference patterns of the coin class X is in fact established but a final recognition cannot be implemented because there are also further coin classes, the similarity of which to the coin class X is known already. For example, this concerns forgeries of coins which can be very similar to real coins in the case of "good forgery". It cannot be precluded that, with the same diameter and similar embossings, sometimes also genuine coins can have different nominal values. In this case, an additional accuracy test is required as third step for a final decision.

The brightness distribution in the transformed picture can also be used for the accuracy test. If there are differences of specific fragments of the embossings, these fragments can be selected as patterns for the accuracy test. If different features are distributed on the entire image a difference characteristic of the features can be calculated as follows:

$$Uij(x,y)=K(x,y)*(hi(x,y)-hj(x,y)) \quad (1)$$

hi(x, y) and hj(x, y) being average-free brightness distributions in the reference patterns of similar classes i and j. K is a factor which can be determined such that only significantly different positions are jointly included, for example:

$$K(x,y)=\left\{\frac{1 \Leftarrow h_i(x,y)<0.5h_j(x,y);\ h_i(x,y)>2h_j(x,y)}{0 \Leftarrow h_i(x,y)\geq 0.5h_j(x,y)\cap h_i(x,y)<2h_j(x,y)}\right\} \quad (2)$$

The comparison of this difference of a transformed image which is more similar to class i produces a positive signal and an image which is more similar to class j produces a negative signal. If a plurality of classes are similar to each other, such differences or difference fragments must be produced and tested for each pair of classes.

In order to reduce further the number of incorrect recognitions, reference patterns of the embossings of coins, which can occur particularly frequently at the location of the relevant coin-acceptor unit, can be subjected, independently of the test according to the simplified first criterion, to the exact test corresponding to the second criterion. Part of this is for example a number side which is identical for all Euro coins and the probability of the appearance of which as a current image is 0.5. This should be tested in any case. Such patterns can be inserted for example at the beginning of the sorted temporary list without implementing a comparison corresponding to the simplified criterion.

In FIG. 4, a method course of the method according to the invention is represented. The evaluation device of the coin-acceptor unit receives, from the image recording module, a current high-resolution image of the coin with an exactly determined diameter, shape and centre. The determined diameter and the determined shape are compared, in step S1, with the list of permissible diameters and the shape of the coin. If an impermissible value or an impermissible shape are present, the coin is immediately rejected.

In the permissible case, the image, in step S2, is subjected to a modified polar transformation with simultaneous spreading of the features and reduction of the image, as a result of which the transformed image corresponding to FIG. 3*b*2 or *b*3 is produced. From all the reference patterns stored in the system, those which belong to a coin with a corresponding diameter are selected for the embossed pattern recognition. For the transformed image, a characteristic for the simplified criterion is calculated in step S3, e.g. a distribution of the average brightness for the individual lines of the transformed image. This characteristic is compared, in step S4, with the corresponding characteristics of the reference patterns which are stored in a data bank PKRM for the current diameter, all the patterns being sorted in the sequence of reducing similarity. Hence a temporary sorted list of reference patterns is formed (see S5). An additionally stored frequency list HL thereby exists. If the reference patterns of the list occur in this frequency list, these patterns are inserted at the beginning of the list without comparison of the characteristics thereof.

The current transformed image of the coin is compared, in step S6, with the first reference pattern from the temporary list according to the second, exact criterion corresponding to a two-dimensional brightness distribution, e.g. with the help of a two-dimensional correlation. For this purpose, the corresponding reference patterns are delivered from the data bank GKRM. If it is established in step S7 that the result of the comparison exceeds with the respective reference pattern A of class X a predetermined similarity value, the comparison is stopped and the coin is sorted temporarily into a class X. If the class X has no known similarity with another class, this temporary classification is confirmed and the process is ended, i.e. the coin is recognised as permissible.

If it is established in step S7 that the similarity to the treated reference pattern is not great enough, it is established in step S8 whether there is still a further reference pattern in the temporary list TLRM. If this is the case, the process goes back to step S6 and a repeated test begins.

If it is established in step S7 that a possibility exists for confusion with a reference pattern of a class Y, the accuracy test is implemented in step S9, in which for example either fragments are sought which occur in one of the classes and not in another or the current transformed image is compared with a difference characteristic. The reference patterns or the reference values for the accuracy test are stored in a data bank MSP.

The comparison of the current embossed pattern or of the transformed image with the reference patterns is, if no valid result is present, stopped after the predetermined time.

The evaluation unit, i.e. the calculation- comparison- and storage means, can be configured in the form of a microprocessor, microcomputer or the like with corresponding memories, as indicated above.

In the above embodiment there was used as "simplified criterion" for the comparison, the result of a one-dimensional correlation between the distributions of the average brightness in lines of the transformed picture as specific characteristics. As another example of a simplified criterion, a result of a specific operation with the distribution of the light and dark pixels in one of the lines of the transformed image could be used. For example there are in the image of a number side of a German coin with the nominal value 1 or 2 Euros more dark pixels than light ones and, in a head side of the same coin, there are more light pixels than dark ones. If the quotient of the number of light/number of dark is used as a criterion, the head side of a German coin can be differentiated from the number side thereof.

Furthermore, the same characteristic can be used, namely the distribution of the average brightness in the lines of the transformed image but a different criterion can be selected for the comparison. For example, the coordinate of the maximum of the distribution can be used. If the maximum is situated at the edge of the coin in the current image, only the reference images which have the maximum of the distribution also at the edge are chosen for the exact comparison etc.

The invention claimed is:

1. A method for recognizing a coin which is inserted in a coin-acceptor unit by using the embossed image thereof which has characteristic features, said embossed image being recorded by a camera device, the method comprising: spreading of the features, which prescribe a pattern arrangement, in the image of the coin such that the features are physically enlarged in the image, scaling down the features by scaling down the image and transforming the same with a polar transformation, comparing the transformed image with a plurality of prescribed reference patterns, according to a first simplified criterion, with a rapid processing time and producing a list of reference patterns, sorted according to their similarity to the transformed image, comparing the transformed image with the reference patterns contained in the list corresponding to the sorting thereof according to a second, exact criterion and emitting a recognition signal if one of the reference patterns corresponds to the transformed image, stopping the comparison process and rejecting the coin according to a prescribed condition.

2. The method according to claim 1 wherein the spreading of the features and the reduction of the image are implemented at the same time.

3. The method according to claim 1 wherein the spreading of the features and the reduction of the image are implemented with at least one of a maximum filter and a minimum filter, the N×M pixels of which corresponds to the reduction factor, wherein N is the width and M is the height of the maximum or minimum filter.

4. The method according to claim 3 wherein the reduced and spread image is subjected to a polar transformation.

5. The method according to claim 1 wherein the spreading of the features and the reduction of the image are implemented with a modified polar transformation, a corresponding origin point in the image with a spacing $N*r$ from the center of the coin and an angle $M*\theta$ relative to an orientation determined for the image corresponding to any point in the transformed image with the polar coordinates $\theta$, r, wherein $\theta$ is an angle and r is a distance to a center of the polar transform, and the brightness of the point in the transformed image being calculated as maximum of the brightness of the image on the area of the $K*K$ pixels around the origin and K being the greater of the reduction factors (N, M), wherein N is the reduction factor in radial distance and M is the reduction factor in angular direction.

6. The method according to claim 1 wherein, for the first, simplified criterion, a line-wise calculation of the brightness distribution in the transformed image is undertaken.

7. The method according to claim 6 wherein the comparison between the transformed image and the reference pattern is implemented with a one-dimensional correlation between the brightness distribution for the transformed image of the coin and the reference pattern.

8. The method according to claim 1 wherein, for the second, exact criterion, a two-dimensional brightness distribution is used in the transformed image.

9. The method according to claim 8 wherein the comparison between the transformed image and the reference pattern is implemented with the help of a two-dimensional correlation.

10. The method according to claim 1 wherein, as a prescribed condition for stopping the comparison process according to the exact criterion, a predetermined number of reference patterns to be processed is chosen.

11. The method according to claim 1 wherein, as a prescribed condition for stopping the comparison process, a predetermined time which the coin requires until exiting from the coin-acceptor unit is chosen.

12. The method according to claim 1 wherein, in the case where, after the comparison corresponding to the second, exact criterion, it is established that a similarity of the transformed image to at least two coin classes is present, an accuracy test is undertaken in which features are determined for the transformed image which are different for the at least two coin classes.

13. The method according to claim 12 wherein a predetermined fragment of the transformed image is compared with the at least two reference patterns and the similar reference pattern is determined.

14. The method according to claim 12 wherein at least one difference pattern between reference patterns is produced and, by means of this comparison with the transformed image, a mostly similar reference pattern is determined.

15. The method according to claim 1 wherein selected reference patterns are added to the beginning of the list of reference patterns which is sorted according to the result of the comparison corresponding to the first, simplified criterion of similarity, independently of this result, and are subjected to a test according to the second, exact criterion of similarity.

16. A device for recognizing a coin which is inserted in a coin-acceptor unit by using the embossed image thereof which has characteristic features, the device including a camera for recording the embossed pattern of the coin and recording an embossed image of the coin, the device recognizing the coin by: spreading the features, which prescribe a pattern arrangement, in the image of the coin such that the features are physically enlarged in the image, scaling down the features by scaling down the image and transforming the same with a polar transformation, comparing the transformed image with a plurality of prescribed reference patterns, according to a first simplified criterion, with a rapid processing time and producing a list of reference patterns, sorted according to their similarity to the transformed image, comparing the transformed image with the reference patterns contained in the list corresponding to the sorting thereof according to a second, exact criterion and emitting a recognition signal if one of the reference patterns corresponds to the transformed image, stopping the comparison process and rejecting the coin according to a prescribed condition, the device further including an evaluation device, the evaluation device comprising: calculation means for spreading the features in the image, scaling down the features by scaling down the image and transforming the same with a polar transformation, first comparison means for comparing the transformed image with a plurality of prescribed reference patterns, according to a first simplified criterion, with a rapid processing time, second comparison means for comparing the transformed image with the reference patterns contained in the list corresponding to the sorting thereof according to a second, exact criterion and emitting a recognition signal if one of the reference patterns corresponds to the transformed image, and first memory means for storing characteristics of the reference patterns for comparison according to the first criterion, second memory means for intermediate storage of the list produced by the first comparison pattern, and third memory means for storing characteristics of the reference patterns for comparison according to the second criterion.

17. The method according to claim 2 wherein the spreading of the features and the reduction of the image are implemented with at least one of a maximum filter and a minimum filter, the N×M pixels of which corresponds to the reduction factor, wherein N is the width and M is the height of the maximum or minimum filter.

18. The method according to claim 17 wherein the reduced and spread image is subjected to a polar transformation.

19. The method according to claim 2 wherein the spreading of the features and the reduction of the image are implemented with a modified polar transformation, a corresponding origin point in the image with a spacing N*r from the center of the coin and an angle M*θ relative to an orientation determined for the image corresponding to any point in the transformed image with the polar coordinates θ, r, wherein θ is an angle and r is a distance to a center of the polar transform, and the brightness of the point in the transformed image being calculated as maximum of the brightness of the image on the area of the K*K pixels around the origin and K being the greater of the reduction factors (N, M), wherein N is the reduction factor in radial distance and M is the reduction factor in angular direction.

20. The method according to claim 2 wherein, for the first, simplified criterion, a line-wise calculation of the brightness distribution in the transformed image is undertaken.

* * * * *